United States Patent [19]

Gaussa, Jr. et al.

[11] Patent Number: 5,392,321
[45] Date of Patent: Feb. 21, 1995

[54] METHOD AND SYSTEM FOR MAGNETIC COUPLING COMPENSATING A ROD POSITION INDICATION SYSTEM

[75] Inventors: Louis W. Gaussa, Jr., Penn Township, Westmoreland County; Arun P. Sahasrabudhe, West Mifflin, both of Pa.

[73] Assignee: Westinghouse Electric Corporation, Pittsburgh, Pa.

[21] Appl. No.: 185,356

[22] Filed: Jan. 24, 1994

[51] Int. Cl.⁶ ............................... G21C 17/00
[52] U.S. Cl. ............................ 376/258; 376/240
[58] Field of Search ............... 376/258, 235, 240; 976/DIG. 242; 340/870.36

[56] References Cited

U.S. PATENT DOCUMENTS

| | | | |
|---|---|---|---|
| 3,519,535 | 7/1970 | French et al. | 376/224 |
| 3,591,733 | 7/1971 | Pflughaupt | 179/100.2 |
| 3,609,528 | 9/1971 | Smith | 324/34 R |
| 3,701,007 | 10/1972 | Schad | 324/43 R |
| 3,742,409 | 6/1973 | Santis et al. | 336/45 |
| 3,852,661 | 12/1974 | Szabo et al. | 324/34 PS |
| 4,628,251 | 12/1986 | Halder | 323/340 |
| 4,631,537 | 12/1986 | Neuner et al. | 340/870.17 |
| 4,714,926 | 12/1987 | Neuner | 340/870.36 |

*Primary Examiner*—Donald P. Walsh
*Assistant Examiner*—Meena Chelliah
*Attorney, Agent, or Firm*—Peyton C. Watkins

[57] ABSTRACT

A method for magnetic coupling compensating a rod position indication system having at least two rod position indicators each having induced noise comprising the steps of applying a sinusoidal current to a primary of the first rod position indicator for inducing a voltage on a first secondary of the first rod position indicator; receiving both the first secondary voltage from the first rod position indicator and a second secondary voltage, induced from the noise, of the second rod position indicator; and deriving a difference of the first and second secondary voltage for obtaining the magnetic coupling compensation.

10 Claims, 4 Drawing Sheets

METHOD AND SYSTEM FOR MAGNETIC COUPLING COMPENSATING A ROD POSITION INDICATION SYSTEM

BACKGROUND OF THE INVENTION

1. Field of the Invention

The invention relates generally to compensating a rod position indication system of a nuclear reactor vessel and, more particularly, to magnetic coupling compensating such a rod position indication system.

2. Description of the Related Art

In a commercial nuclear reactor, heat, from which steam and ultimately electricity are generated, is produced by fissioning of a fissible material such as enriched uranium. This fissible material, or nuclear fuel, is typically contained within a nuclear core made up of a multiplicity of fuel rods supported in a plurality of nuclear fuel assemblies, coextensively arranged in a spaced parallel array.

Movable control rods are dispersed throughout the core to control the fission process. The control rods generally comprise a plurality of elongated rods containing neutron absorbing materials which fit in longitudinal openings defined in the fuel assemblies and among the fuel rods by guide thimbles of the fuel assemblies. The guide thimbles thus guide the control rods during their movement into and out of the core. Inserting a control rod into the core adds more absorber material and, hence, decreases the nuclear reaction; conversely, withdrawing a control rod removes absorber material and, hence, increases a nuclear reaction and thereby the power output of the core. The nuclear reactor core and the control rods are positioned within and supported by a reactor vessel through which a reactor coolant flows.

The control rods are supported in cluster assemblies moved into and from the nuclear core by control rod drive mechanisms which, in turn, are mounted by an upper internals arrangement located within the nuclear reactor vessel above the nuclear core. Typically, a reactor pressure vessel is pressurized to a relatively high internal pressure. The control rod drive mechanisms operate within the same pressure environment that exists within the reactor pressure vessel. Hence, the control rod drive mechanisms are housed within pressure housings of the upper internals arrangement which are tubular extensions of the reactor pressure vessel.

One of the more commonly used types of control rod drive mechanisms is referred to as a "magnetic jack." With this type of mechanism, the control rods are jacked into and from the nuclear core in a series of motions each involving moving the control rod a discrete incremental distance or "step;" hence, such movement is commonly referred to as stepping of the control rods. This type of mechanism is illustrated and described in U.S. Pat. No. to Frisch (3,158,766) and Dewesse (3,992,255) which are assigned to the assignee of the present invention.

This magnetic jack type of control rod drive mechanism includes three electromagnetic coils and armatures or plungers which are operated to raise and lower a drive rod shaft and thereby the control rod cluster assembly. The three coils are mounted about and outside of the pressure housing. Two of the coils actuate respective plungers of movable and stationary grippers contained within the housing. The third coil actuates a lift plunger connected to the movable gripper. Actuation of the movable and stationary plungers, in turn, operate sets of circumferentially spaced latches which grip the drive rod shaft having multiple axially-spaced circumferential grooves. the stationary gripper latches are actuated to hold the drive shaft in a desired axial position. The movable gripper latches are actuated to raise and lower the drive rod shaft. Each jacking or stepping movement is of the control rod drive mechanism moves the drive rod shaft 5/8 inch (1.58 cm) The jacking or stepping movement is thus accomplished by the operation of the three sets of axially spaced electromagnetic coils to actuate the corresponding stationary, movable and lift plungers so as to alternately and sequentially grip, move and release the control rod drive shaft of the respective mechanism.

A number of indicators have been used in the past to determine control rod position. One such indicator is an analog indicator. This analog indicator includes a plurality of layered, wound coils concentrically arranged in a stack and supported by a nonmagnetic stainless steel tubular substructure that is slid over a nonmagnetic rod travel housing. The coils are arranged alternately as primary and secondary coils, with all the primary coils connected in series and all the secondary coils connected in series. The coils form, in effect, a long linear voltage transformer distributed over the height of the travel housing such that the coupling from primary to secondary is affected by the extent to which the magnetic drive rod penetrates the coil stack. Rod position is determined by applying a constant sinusoidal excitation current to the primary and measuring the voltage induced across the secondary. The magnitude of the induced secondary voltage corresponds to rod position. This secondary voltage is processed by instrumentation, which is well known in the art, and displayed on a control panel.

Although the present device for detecting control rod position is satisfactory, it is not without drawbacks. There are a plurality of indicators on the reactor vessel, and as a result of the indicators placed adjacent to one another, the primary and secondary of one indicator electromagnetically induces a residual voltage on the secondary of an adjacent indicator, generally referred to in the art as "noise" or "magnetic coupling." This noise affects the secondary voltage of the affected indicator which, in turn, affects the accuracy of the position of the control rods indicated by the control panel.

Consequently, a need exists for a method and system for magnetic coupling compensating a rod position indication system.

SUMMARY OF THE INVENTION

The present invention provides an improvement designed to satisfy the aforementioned needs. Particularly, the present invention is directed to a method for magnetic coupling compensating a rod position indication system having at least two rod position indicators each having induced noise comprising the steps of a) applying a sinusoidal current to a primary of the first rod position indicator for inducing a voltage on a first secondary of the first rod position indicator; b) receiving both the first secondary voltage from the first rod position indicator and a second secondary voltage, induced from the noise, of a second rod position indicator; and c) deriving a difference of the first and second secondary voltage for obtaining the magnetic coupling compensation.

It is an object of the present invention to provide a system for magnetic coupling compensating a rod position indication system.

It is an object of the present invention to provide a system for temperature compensating the rod position indication system immediately after magnetic coupling compensation.

It is a feature of the present invention to provide a differential amplifier connected to the secondaries of two adjacent rod position indicators for obtaining a voltage difference of the two secondaries.

BRIEF DESCRIPTION OF THE DRAWINGS

In the course of the following detailed description, reference will be made to the attached drawings in which.

DESCRIPTION OF THE PREFERRED EMBODIMENT

Figure 1:
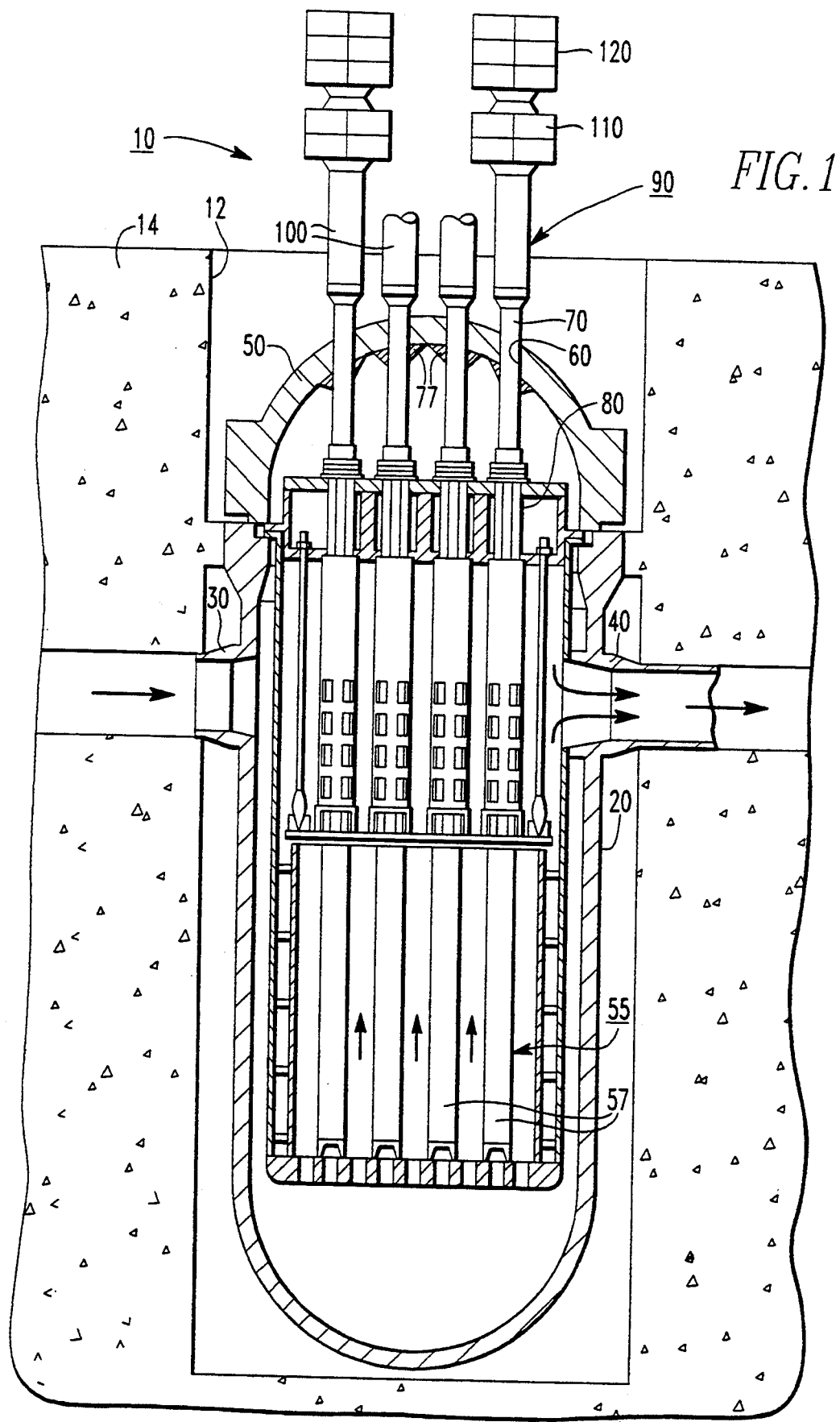
FIG. 1 illustrates a view in vertical cross section of a typically nuclear power plant reactor vessel and its rod position indicator.

In the following description, like reference characters designate like or corresponding parts throughout the several views of the drawings. Also, in the following description, it is to be understood that such terms as "forward," "left," "right," "upwardly," "downwardly," and, the like are words of convenience and are not to be construed as limiting terms.

Referring now to the drawings, and particularly to FIG. 1, there is shown a typical nuclear power reactor vessel, generally referred to as 10, for producing heat by a controlled fission of a fissionable material (not shown). The reactor vessel 10 is disposed in a reactor cavity 12 defined by a containment building 14. The reactor vessel 10 includes a cylindrical shaped bottom 20 open at its top end and having a plurality of inlet nozzles 30 and outlet nozzles 40 attached to the upper portion thereof (only one of each nozzle is shown). A flanged, hemispherical shaped reactor vessel closure head 50, which may be carbon steel, is mounted atop the bottom 20 and is sealingly attached to the open top end of the bottom 20 so that the closure head 50 sealingly caps the bottom 20. Capping the bottom 20 in this manner allows for suitable pressurization of the coolant (not shown) circulating through the bottom 20 as the reactor vessel 10 operates. The coolant may be borated demineralized water maintained at a relatively high pressure sure of approximately 2500 psia and a temperature of approximately 650 degrees Fahrenheit.

A reactor core 55 is disposed in the interior of the reactor vessel 10. The reactor core 55 comprises a plurality of nuclear fuel assemblies 57 containing the fissionable material. The fuel assemblies 57 include a plurality of vertically extending fuel rods (not shown) structurally bound together. A plurality of vertically extending thimble tubes (not shown) are selectively positioned within each fuel assembly 57 for receiving a control rod which functions to control the fissionable process. The thimble tubes are structurally bound together by a spider assembly forming a movable control rod cluster (not shown in FIG. 1).

A plurality of closure head openings 60 are formed through the top of closure head 50 for respectively receiving a plurality of generally tubular shaped control rod drive mechanism (CRDM) penetration tubes 70. Each penetration tube 70 is affixed to the closure head 50 by weldments 77. Each CRDM penetration tube 70 houses a control rod drive shaft (not shown) extending therethrough; the drive shaft engaging at least one movable control rod cluster.

A control rod drive mechanism (CRDM) 90 is connected to the penetration tube 70 for axially moving a drive rod 80 and thus the control rod cluster connected thereto. The CRDM comprises a generally tubular pressure housing 100, which may be type 304 stainless steel. An electromagnetic coil stack assembly 110 is attached to the pressure housing 100 for electromagnetically and axially moving the drive rod 80 as the coil stack assembly 110 is electrically energized. When the coil stack assemblies 110 are energized, the control rods are fully withdrawn from the core 55. When the coil stack assemblies 110 are de-energized, the control rods are fully inserted into the core 55. A rod position indicator (RPI) 120 is attached to the coil stack assembly 110 for monitoring the position of the control rods, as is well known in the art.

AS the reactor vessel 10 operates, the coolant enters the bottom 20 and circulates therethrough generally in the direction of the arrows. As the coolant circulates through the bottom 20, it also circulates over the fuel assemblies 57 for assisting in the fission process and for removing the heat produced by fission of the fissionable material contained in the fuel assemblies 57. The coil stack assemblies 110 axially move the control rod clusters in and out of fuel assemblies 57 to suitably control the fission process therein. The heat, generated by the fuel assemblies 57, is ultimately transferred to a turbine-generator set for producing electricity in a manner well known in the art.

Figure 2:
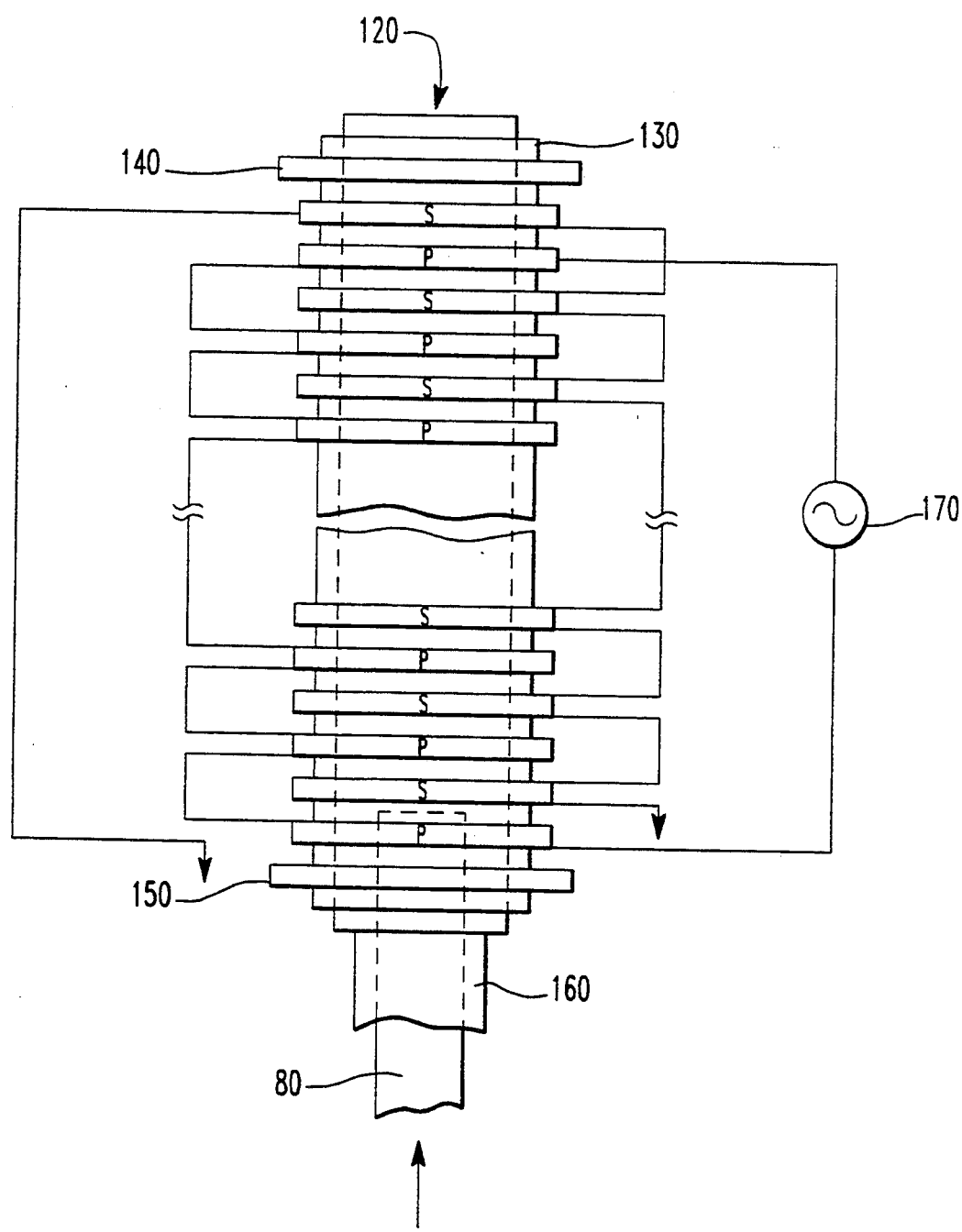
FIG. 2 illustrates a view in side elevation of a rod position indicator.

FIG. 2 illustrates a rod position indicator 120 of the linear voltage type with which the method and device of the present invention are particularly useful for compensating its output for variations due to magnetic coupling and temperature compensation. It should be understood that the present method is not restricted with application to the linear voltage transformer indicator but rather may be used with other types of rod position indicators, including the one described below which employs a single long winding, the resistance of which varies as a function of rod position.

The indicator 120 includes a plurality of annular, layered-wound primary coils P which are electrically connected in series to form a primary winding, and a plurality of annular, layered-wound secondary coils S which are electrically connected in series to form a secondary winding. The coils P and S are stacked in tandem and are mounted on a coil form 130 having end plates 140 and 150. The coil form 130 includes a thin nonmagnetic stainless steel tubular substructure that is slid over a nonmagnetic rod travel housing 160 which encloses the drive rod 80. The secondary coils S are alternatively interleaved and inductively coupled with the primary coils P, with a secondary coil S located at the top of the coil stack and a primary coil located at the bottom of the coil stack. A sinusoidal current source 170 is connected to the primary for exciting a current in the primary winding which induces a voltage across terminals of the secondary winding.

In one illustrative configuration, the coil form 130 is approximately 393.7 cm long with a combined primary and secondary active coil length of approximately 384.81 cm. The active coil includes layered-wound coils, half of which are primary coils P with the other half being secondary coils S alternatively interleaved as discussed above. Each coil is 13.72 cm in diameter and approximately 5.08 cm high. The primary coils P are essentially identical while the secondary coils S preferably have progressively more turns near the bottom of the detector. A space of approximately 7.62 cm exists between the lowest primary coil P and the bottom end plate 150 of the coil form 130.

The drive rod 80 is made of a metal having magnetic properties. As may be appreciated, as the drive rod 80 moves up through its housing, the coupling between the primary and secondary windings increases which causes a proportional increase in the magnitude of the voltage induced in the secondary winding. The secondary voltage thus also corresponds to the position of the control rod 55 as it is withdrawn from the core 55 of the reactor vessel 10. While in theory the relationship between the secondary voltage and rod position should be linear, in fact there are a number of variables which introduce error into the output of the secondary winding. One such error is electromagnetic linkage between the primary and secondary of one indicator 120 and the primary and secondary of a plurality of indicators 120 located nearby. The system of the present invention includes a method and device for compensating the rod position indication system for such linkage.

Figure 3:
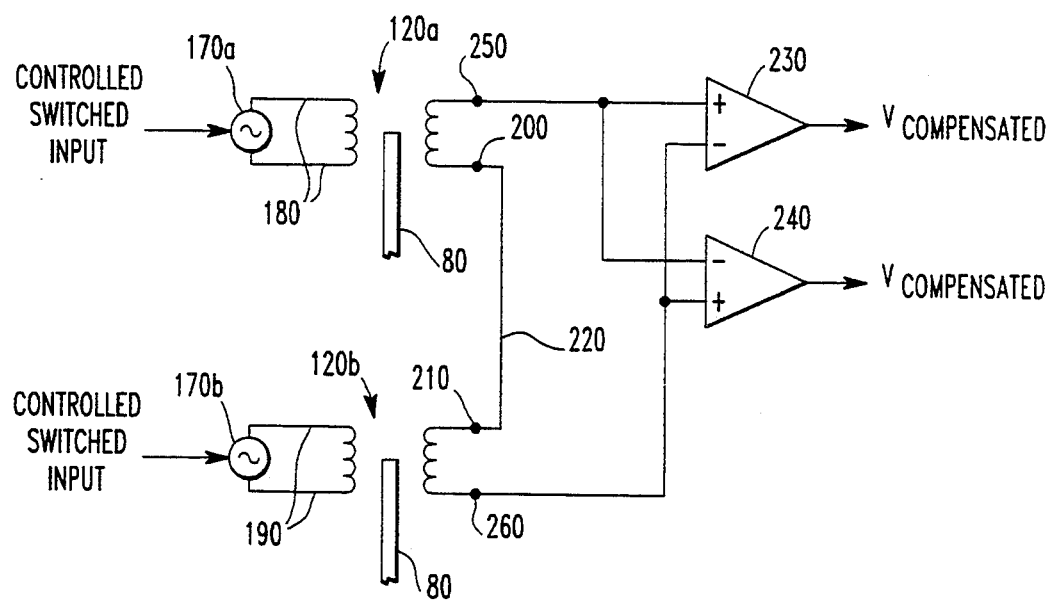
FIG. 3 illustrates a schematic diagram of a circuit of the present invention for magnetic coupling compensation of the rod position indicator.

FIG. 3 illustrates a circuit of the present invention for compensating for electromagnetic linkage. Two sinusoidal current sources 170a and 170b are respectively connected to the primaries of two adjacent indicators 120a and 120b for activating and inducing a voltage on its respective secondary. Although adjacent indicators are used in this embodiment, any two indicators 120 having electromagnetic linkage could be used. The current sources 170a and 170b are turned on and off by electronic circuitry located in a control room (not shown), each respectively via cabling 180 and 190. A termination 200 and 210 of the secondary of each detector is tied together via a cable 220 for connecting the two secondaries in series, and two differential amplifiers 230 and 240 are then connected in parallel via the unconnected terminations 250 and 260 of each secondary. With this parallel connection, each differential amplifier 230 and 240 produces an output representative of the difference of the two secondary outputs. It is instructive to note that the termination 250 is connected to the positive terminal of the differential amplifier 230 and to the negative terminal of the differential amplifier 240, and the termination 260 is, likewise, connected to terminals of different polarities on each differential amplifier 230 and 240. With this configuration, the output of each amplifier 230 and 240 produces a positive output during operation, as will be described later in detail. Although two differential amplifiers 230 and 240 are used in this embodiment, it can be appreciated by those skilled in the art that one differential amplifier may also be used in lieu of two differential amplifiers. However, with one differential amplifier, the output of the differential amplifier varies from positive to negative.

To operate the circuit for magnetic coupling compensation of the indicator 120a, the current source 170a is turned on, and the other current source 170b is turned off. With the indicator 120a activated, the secondary output of the activated indicator 120a includes the actual voltage representative of the drive rod 80 position plus a voltage induced from electromagnetic fields of other indicators (not shown) located nearby, which is hereinafter referred to as noise. This noise will be substantially equally induced on both secondaries, and the de-activated indicator 120b will, therefore, only have a voltage representative sentative of the noise on its secondary. The voltage induced across the terminals of the differential amplifier 230, to which the secondaries are connected, is equal to the difference of the two secondary voltages, the magnetic coupling compensation voltage of the indicator 120a. In effect, the noise induced on one secondary cancels out the noise induced on the other secondary. The above may be represented by the following equation:

$$V_{compensated} = V_{secondary\,1} - V_{secondary\,2}$$
$$V_{compensated} = (V_{actual\,position} + V_{noise}) - (V_{noise})$$
$$V_{compensated} = V_{actual\,position}$$

The polarity connection arrangement of the secondaries to the differential amplifier 230, as described above, ensures that the output of the differential amplifier 230 is a positive number. The differential amplifier 240 is not operated during the compensation of the indicator 120a.

To operate the circuit for compensation of the indicator 120b, its current source 170b is turned on, and the other current source 170a is turned off. The compensated voltage is measured across the terminals of the differential amplifier 240 in the same manner as stated above; similarly, the differential amplifier 230 is inactive during the compensation of the indicator 120b. The above compensation steps may be repeated for all indicators by pairing two indicators together and repeating the above described process.

Figure 4:
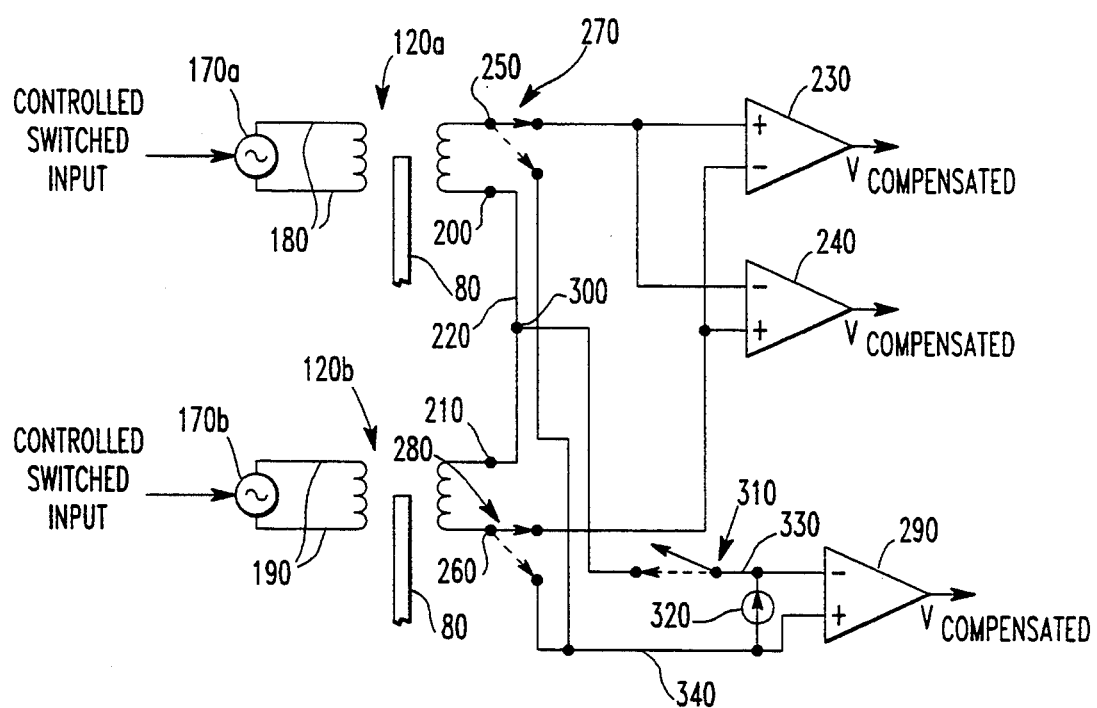
FIG. 4 illustrates an alternative embodiment of the present invention including, in addition to the magnetic coupling compensation circuit, a circuit for temperature compensation.

FIG. 4 illustrates an alternative embodiment of the present invention and depicts a device for temperature compensating indicators 120a and 120b immediately subsequent to the magnetic coupling compensation. Through extensive evaluation, it has been found that a major source of system error is introduced by variation in the temperature of the drive rod 80 which is caused by changes in coolant temperature. The reason for this is that the permeability and resistivity of the drive rod 80 are temperature dependent so that as the temperature of the drive rod 80 changes, its permeability and resistivity also change which, of course, directly affects the coupling between the primary and secondary windings of the indicator.

Obviously, either the secondary voltage of the indicator has to be recalibrated each time the temperature of the coolant (and hence of the drive rod) changes, or some form of compensation for the errors caused by temperature has to be made.

A measurement which is directly responsive to the temperature of the drive rod 80 for purposes of temperature compensation of the secondary voltage of the indicator would thus be preferred to any indirect temperature measurement. This is accomplished in accordance with the embodiment of FIG. 4 for measuring the resistance of both secondaries. The description below will be further appreciated by noting that the resistance of both secondaries varies generally linearly from 50 to 80 ohms over the operating temperature (70 F. to 650

F.) of the reactor vessel (see FIG. 1). Therefore, there is a direct correlation between temperature and resistance of the secondaries.

In this regard, two switches 270 and 280 are connected respectively to the two terminations 250 and 260 of each secondary for switching the device to the temperature compensation mode immediately after magnetic compensation. A negative terminal of a third differential amplifier 290 is connected to both switches 260 and 270, and a positive terminal of the third differential amplifier 290 is tied to the series connection between the secondaries forming a termination 300. A third switch 310 is attached between the termination 300 and the positive terminal, and is in the on position (indicated by the dashed line) only when temperature compensation takes place. During magnetic coupling compensation, the switch 310 is in the off position (indicated by the solid line) for eliminating any current flow to the third differential amplifier 290. A direct current (DC) source 320 is connected between leads 330 and 340 extending from the terminals of the differential amplifier 290 for providing direct current during temperature compensation.

To temperature compensate the indicators 120a and 120b, all three switches 270, 280, and 310 are placed in the position indicated by the dashed lines, which temporarily terminates the magnetic coupling compensation. With this configuration, DC flows from the DC source 320, through both secondaries, and returns to the third differential amplifier 290. In effect, this measures the resistance of the secondaries. The third differential amplifier 290 obtains the results of the resistance and passes it along to process instrumentation for further processing. A system and method for using the resistance values for temperature compensation are disclosed in U.S. Pat. No. 4,714,926 which is assigned to the assignee of the present invention and is herein incorporated by reference. After temperature compensation, the switches 270, 280, and 310 are switched to the off position for continuing magnetic coupling compensation.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

We claim:

1. A method for magnetic coupling compensating a rod position indication system having two rod position indicators each having induced noise comprising the steps of:
   a) applying a sinusoidal current to a primary of the first rod position indicator for inducing a voltage on a first secondary of the first rod position indicator;
   b) deactivating a sinusoidal current to a second rod position indicator for obtaining a secondary voltage from the second rod position indicator having induced noise;
   c) receiving both the first secondary voltage from the first rod position indicator and the second secondary voltage, induced from the noise, of the second rod position indicator; and
   d) deriving a difference of the first and second secondary voltage for obtaining the magnetic coupling compensation of the first rod position indicator.

2. The method as in claim 1 further comprising the step of applying a direct current to the first secondary of the first rod position indicator and to the second secondary of the second rod position indicator after termination of magnetic coupling compensation for measuring the resistance of both secondaries which, in turn, is used for obtaining temperature compensation.

3. The method as in claim 2 further comprising the step of connecting the first and second secondaries in series for obtaining a resistance of the first and second secondaries and for magnetic coupling compensating the rod position indication system.

4. The method as in claim 3 further comprising connecting a first and second amplifier in parallel to the first and second secondaries for obtaining the magnetic coupling compensation.

5. A system for magnetic coupling compensating a rod position indication system having two rod position indicators each having induced noise, the system comprising:
   a) a first means connected to a primary of the first rod position indicator for applying a sinusoidal current to the primary of the first rod position indicator for inducing a voltage on a first secondary;
   b) a second means connected to a primary of a second rod position indicator for applying a sinusoidal current to the primary of a second rod position indicator for inducing a voltage on a second secondary;
   wherein said first sinusoidal current applying means is activated and said second sinusoidal current applying means is deactivated when the first rod position indicator is compensated; and
   wherein said first sinusoidal current applying means is deactivated and said second sinusoidal current applying means is activated when the second rod position indicator is compensated;
   c) means connected to both the first secondary of the first indicator and to the second secondary of the second indicator for receiving the first secondary voltage from the first secondary and the second secondary voltage from the second secondary; and
   wherein said receiving means includes means for deriving a difference of the first and second secondary voltage for magnetic coupling the rod position indication system.

6. The system as in claim 1 further comprising means connected to both the first and second secondary for applying a direct current to the first secondary and to the second secondary after magnetic coupling compensation for measuring resistance of both secondaries which, in turn, is used for temperature compensating the rod position indicator system.

7. The system as in claim 6, wherein said receiving means includes a first and second amplifier connected in parallel for obtaining a positive difference of the secondary voltages.

8. The system as in claim 7, wherein the first and second secondaries are connected in series for magnetic coupling compensation and temperature compensation.

9. The system as in claim 8 further comprising a third amplifier connected to the series connection for deriving the resistance of the first and second secondaries.

10. The method as in claim 1 further comprising the steps of:

d) applying a sinusoidal current to the primary of the second rod position indicator for inducing a voltage on the second secondary of the second rod position indicator; and e) deactivating a sinusoidal current to the first rod position indicator for obtaining a secondary voltage from the first rod position indicator having induced noise;

wherein the difference of step (d) represents the magnetic coupling compensation of the second rod position indicator.

* * * * *